US011328171B2

(12) United States Patent
Chen et al.

(10) Patent No.: US 11,328,171 B2
(45) Date of Patent: May 10, 2022

(54) IMAGE RETRIEVAL METHOD AND APPARATUS

(71) Applicant: SHENZHEN SENSETIME TECHNOLOGY CO., LTD., Shenzhen (CN)

(72) Inventors: Dapeng Chen, Shenzhen (CN); Hongsheng Li, Shenzhen (CN); Shuai Yi, Shenzhen (CN); Maoqing Tian, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 36 days.

(21) Appl. No.: 16/914,897

(22) Filed: Jun. 29, 2020

(65) Prior Publication Data

US 2020/0327363 A1    Oct. 15, 2020

Related U.S. Application Data

(63) Continuation of application No. PCT/CN2018/116781, filed on Nov. 21, 2018.

(30) Foreign Application Priority Data

Apr. 19, 2018 (CN) .......................... 201810355179.0

(51) Int. Cl.
*G06K 9/62* (2022.01)
*G06F 16/56* (2019.01)
(Continued)

(52) U.S. Cl.
CPC ........... *G06K 9/6215* (2013.01); *G06F 16/53* (2019.01); *G06F 16/56* (2019.01); *G06K 9/629* (2013.01); *G06V 10/32* (2022.01); *G06V 10/40* (2022.01)

(58) Field of Classification Search
None
See application file for complete search history.

(56) References Cited

U.S. PATENT DOCUMENTS 9,830,631 B1 * 11/2017 Dhua ................. G06Q 30/0623
10,585,953 B1 * 3/2020 Li ............................ G06F 21/10
(Continued)

FOREIGN PATENT DOCUMENTS

CN       102200999 B    10/2012
CN       106295613 A     1/2017
(Continued)

OTHER PUBLICATIONS

Lu, X.—"Hierarchical Image Retrieval by Multi-Feature Fusion"—Apr. 26, 2017 —pp. 1-11 (Year: 2017).*
(Continued)

*Primary Examiner* — Bernard Krasnic
(74) *Attorney, Agent, or Firm* — BakerHostetler

(57) ABSTRACT

The present disclosure relates to an image retrieval method and apparatus. The method includes: obtaining an image group including a query image and at least one candidate image; calculating an intermediate similarity between any two images in the image group; performing multi-scale feature fusion based on the intermediate similarity between the any two images to obtain a final similarity between the query image and each candidate image; and determining a target image corresponding to the query image from each candidate image based on the final similarity. The present disclosure can improve precision and robustness of image retrieval.

16 Claims, 7 Drawing Sheets

(51) Int. Cl.
G06F 16/53 (2019.01)
G06V 10/32 (2022.01)
G06V 10/40 (2022.01)

(56) References Cited

U.S. PATENT DOCUMENTS

| 2005/0117783 | A1 | 6/2005 | Sung et al. |
| 2009/0192824 | A1* | 7/2009 | Minakuchi ............. G16H 15/00 705/3 |
| 2016/0042253 | A1* | 2/2016 | Sawhney ............ G06F 16/3322 382/190 |
| 2017/0124379 | A1 | 5/2017 | Zhang et al. |
| 2019/0102650 | A1* | 4/2019 | Furuya ............... G06K 9/00302 |

FOREIGN PATENT DOCUMENTS

| CN | 106383912 A | 2/2017 |
| CN | 106886599 A | 6/2017 |
| CN | 107153824 A | 9/2017 |
| CN | 107368614 A | 11/2017 |
| CN | 107391594 A | 11/2017 |
| CN | 107704890 A | 2/2018 |
| CN | 108563767 A | 9/2018 |
| JP | 2018-500707 A | 1/2018 |
| JP | 2018-041434 A | 3/2018 |
| KR | 2005-0053130 A | 6/2005 |
| KR | 2015-0087959 A | 7/2015 |

OTHER PUBLICATIONS

Che, C.—"Image retrieval by information fusion based on scalable vocabulary tree and robust Hausdorff distance"—EURASIP Journal on Advances in Signal Processing 2017, pp. 1-13 (Year: 2017).*
Shi, Kuan; "Research on Multi-Similarity Measures Based Image Retrieval"; China Master's Thesis; Aug. 31, 2015; p. 14-19 and 28-37 (contains English abstract).
International Patent Application No. PCT/CN2018/116781; Int'l Search Report; dated Feb. 21, 2019; 2 pages.

* cited by examiner

IMAGE RETRIEVAL METHOD AND APPARATUS

The present application is a continuation of and claims priority under 35 U.S.C. 120 to PCT Application. No. PCT/CN2018/116781, filed on Nov. 21, 2018, which claims priority to Chinese Patent Application No. 201810355179.0, filed with the Chinese Patent Office on Apr. 19, 2018, and entitled "IMAGE RETRIEVAL METHOD AND APPARATUS". All the above-referenced priority documents are incorporated herein by reference in their entirety.

TECHNICAL FIELD

The present disclosure relates to the field of computer vision technologies, and in particular, to an image retrieval method and apparatus.

BACKGROUND

Content-Based Image Retrieval (CBIR) is a research branch that focuses on large-scale digital image content retrieval in the computer vision field. The CBIR allows a user to input one image to find other images including same or similar content.

In a related technology, when training an image retrieval model, a loss function such as a pairwise loss function, a triplet loss function, or a quadruplet loss function is usually used. These loss functions are all used to constrain only an intermediate similarity (i.e., a similarity between two-tuples, triples, or quadruplets). The image retrieval model trained in this way has relatively low precision and robustness in image retrieval.

SUMMARY

In view of the above, the present disclosure provides an image retrieval method and apparatus.

An image retrieval method provided according to one aspect of the present disclosure includes: obtaining an image group including a query image and at least one candidate image; calculating an intermediate similarity between any two images in the image group; performing multi-scale feature fusion based on the intermediate similarity between the any two images to obtain a final similarity between the query image and each candidate image; and determining a target image corresponding to the query image from each candidate image based on the final similarity.

In a possible implementation, the calculating an intermediate similarity between any two images in the image group includes: performing multi-scale feature extraction on each image in the image group to obtain a multi-scale feature vector having a one-to-one correspondence to each image; and calculating the intermediate similarity between the any two images in the image group based on the multi-scale feature vector.

In a possible implementation, the performing multi-scale feature extraction on each image in the image group to obtain a multi-scale feature vector having a one-to-one correspondence to each image includes: extracting a predetermined number of multi-scale feature maps for each image; and standardizing each of the multi-scale feature maps to a feature vector of a predetermined dimension.

In a possible implementation, the calculating the intermediate similarity between the any two images in the image group based on the multi-scale feature vector includes: performing bit-by-bit subtraction on multi-scale feature vectors corresponding to the any two images to obtain a difference vector of two multi-scale feature vectors; squaring the difference vector bit by bit to obtain a square vector of the difference vector; performing normalization processing on the square vector to obtain a normalized vector; performing dimension reduction processing on the normalized vector to obtain a two-dimensional vector corresponding to the normalized vector; and performing normalization processing on the two-dimensional vector to obtain the intermediate similarity between the any two images.

In a possible implementation, the performing normalization processing on the square vector to obtain a normalized vector includes: calculating an average and a variance of the square vector respectively; and subtracting the average from the square vector bit by bit to obtain a value, and then dividing the value by the variance to obtain the normalized vector.

In a possible implementation, the performing dimension reduction processing on the normalized vector to obtain a two-dimensional vector corresponding to the normalized vector includes: calculating a product of the normalized vector and a predetermined coefficient matrix, and using the product as the two-dimensional vector corresponding to the normalized vector.

In a possible implementation, the performing multi-scale feature fusion based on the intermediate similarity to obtain a final similarity between the query image and each candidate image includes: performing final similarity constraint based on the intermediate similarity to obtain a converged final similarity estimate; and performing normalization processing on the converged final similarity estimate to obtain the final similarity.

In a possible implementation, before the performing final similarity constraint based on the intermediate similarity, the method further includes: initializing the final similarity estimate based on the intermediate similarity.

In a possible implementation, the performing final similarity constraint based on the intermediate similarity includes: calculating a first intermediate similarity between the query image and a first image in the candidate image; calculating a second intermediate similarity between the first image and a second image in the candidate image; calculating a final similarity estimate between the query image and the second image; calculating a product of the second intermediate similarity and the final similarity estimate; calculating a weighted superposition result of the first intermediate similarity and the product; and updating the final similarity estimate between the query image and the first image based on the weighted superposition result until the final similarity estimate between the query image and the first image is converged, to obtain a converged final similarity estimate between the query image and the first image.

In a possible implementation, the determining a target image corresponding to the query image from each candidate image based on the final similarity includes: using a candidate image whose final similarity is greater than a preset threshold as the target image corresponding to the query image.

An image retrieval apparatus provided according to another aspect of the present disclosure includes: an obtaining module, configured to obtain an image group including a query image and at least one candidate image; a calculation module, configured to calculate an intermediate similarity between any two images in the image group; a fusion module, configured to perform multi-scale feature fusion based on the intermediate similarity between the any two images to obtain a final similarity between the query image and each candidate image; and a determination module, configured to determine a target image corresponding to the query image from each candidate image based on the final similarity.

In a possible implementation, the calculation module includes: an extraction submodule, configured to perform multi-scale feature extraction on each image in the image group to obtain a multi-scale feature vector having a one-to-one correspondence to each image; and a calculation submodule, configured to calculate the intermediate similarity between the any two images in the image group based on the multi-scale feature vector.

In a possible implementation, the extraction submodule includes: an extraction unit, configured to extract a predetermined number of multi-scale feature maps for each image; and a standardization unit, configured to standardize each of the multi-scale feature maps to a feature vector of a predetermined dimension.

In a possible implementation, the calculation submodule includes: a subtraction unit, configured to perform bit-by-bit subtraction on multi-scale feature vectors corresponding to the any two images to obtain a difference vector of two multi-scale feature vectors; a squaring unit, configured to square the difference vector bit by bit to obtain a square vector of the difference vector; a first normalization unit, configured to perform normalization processing on the square vector to obtain a normalized vector; a dimension reduction unit, configured to perform dimension reduction processing on the normalized vector to obtain a two-dimensional vector corresponding to the normalized vector; and a second normalization unit, configured to perform normalization processing on the two-dimensional vector to obtain the intermediate similarity between the any two images.

In a possible implementation, the first normalization unit includes: a calculation subunit, configured to calculate an average and a variance of the square vector respectively; and a normalization subunit, configured to subtract the average from the square vector bit by bit to obtain a value, and then divide the value by the variance to obtain the normalized vector.

In a possible implementation, the dimension reduction unit is configured to: calculate a product of the normalized vector and a predetermined coefficient matrix, and use the product as the two-dimensional vector corresponding to the normalized vector.

In a possible implementation, the fusion module includes: a constraint submodule, configured to perform final similarity constraint based on the intermediate similarity to obtain a converged final similarity estimate; and a normalization submodule, configured to perform normalization processing on the converged final similarity estimate to obtain the final similarity.

In a possible implementation, the fusion module further includes an initialization submodule, configured to initialize the final similarity estimate based on the intermediate similarity.

In a possible implementation, the constraint submodule includes: a first calculation unit, configured to calculate a first intermediate similarity between the query image and a first image in the candidate image; a second calculation unit, configured to calculate a second intermediate similarity between the first image and a second image in the candidate image; a third calculation unit, configured to calculate a final similarity estimate between the query image and the second image; a fourth calculation unit, configured to calculate a product of the second intermediate similarity and the final similarity estimate; a fifth calculation unit, configured to calculate a weighted superposition result of the first intermediate similarity and the product; and a determination unit, configured to update the final similarity estimate between the query image and the first image based on the weighted superposition result until the final similarity estimate between the query image and the first image is converged, to obtain a converged final similarity estimate between the query image and the first image.

In a possible implementation, the determination module is configured to use a candidate image whose final similarity is greater than a preset threshold as the target image corresponding to the query image.

An electronic device provided according to another aspect of the present disclosure includes: a processor; and a memory configured to store processor executable instructions, where the processor is configured to perform the foregoing method.

A computer readable storage medium provided according to another aspect of the present disclosure has computer program instructions stored thereon, where the foregoing method is implemented when the computer program instructions are executed by a processor.

In the image retrieval method and apparatus according to the aspects of the present disclosure, the image group including the query image and the at least one candidate image is obtained, the intermediate similarity between the any two images in the image group is calculated, multi-scale feature fusion is performed based on the intermediate similarity between the any two images to obtain the final similarity between the query image and each candidate image, and the target image corresponding to the query image is determined from each candidate image based on the final similarity, thereby improving precision and robustness of image retrieval.

Exemplary embodiments are described in detail below according to the following reference accompanying drawings, and other features and aspects of the present disclosure become clear.

BRIEF DESCRIPTION OF THE DRAWINGS

Accompanying drawings included in the specification and constructing a part of the specification jointly show the exemplary embodiments, features, and aspects of the present disclosure, and are intended to explain the principles of the present disclosure.

DETAILED DESCRIPTION

Figure 1:
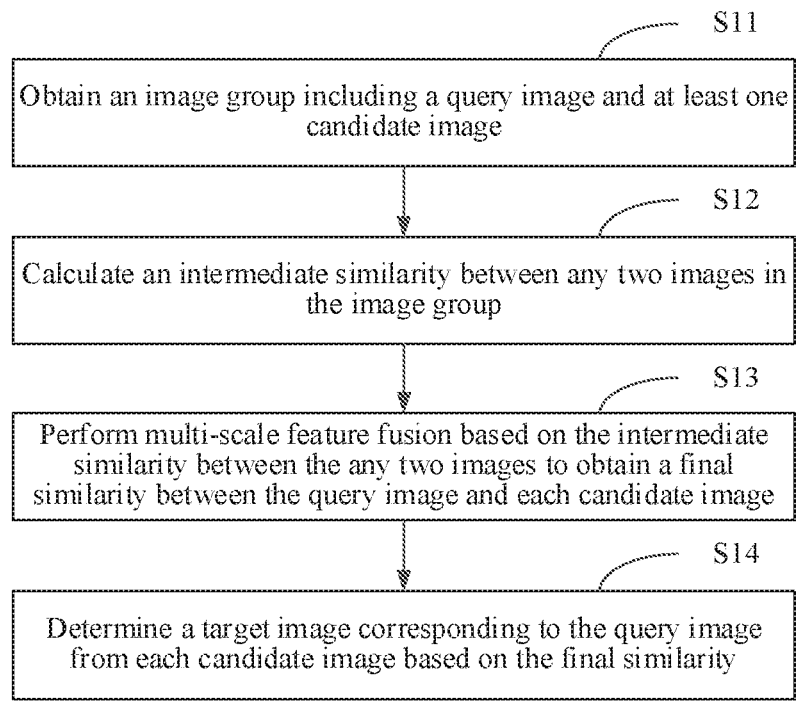
FIG. 1 is a flowchart of an image retrieval method according to an embodiment of the present disclosure.

The following describes various exemplary embodiments, features, and aspects of the present disclosure in detail with reference to the accompanying drawings. Same reference numerals in the accompanying drawings represent elements with same or similar functions. Although various aspects of the embodiments are illustrated in the accompanying drawings, the accompanying drawings are not necessarily drawn in proportion unless otherwise specified.

The special term "exemplary" here refers to "being used as an example, an embodiment, or an illustration". Any embodiment described as "exemplary" here should not be explained as being more superior or better than other embodiments.

In addition, for better illustration of the present disclosure, various specific details are given in the following specific implementations. A person skilled in the art should understand that the present disclosure may also be implemented without the specific details. In some instances, methods, means, elements, and circuits well known to a person skilled in the art are not described in detail so as to highlight the subject matter of the present disclosure.

FIG. 1 is a flowchart of an image retrieval method according to an embodiment of the present disclosure. The method may be applied to a server. As shown in FIG. 1, the method includes step S11 to step S14.

At step S11, an image group including a query image and at least one candidate image is obtained.

An objective of the image retrieval method provided in the embodiments is to retrieve, from an image library, an image including same or similar content to the query image. In the embodiments, an image in the image library is used as a candidate image. The image group in the embodiments includes the query image and at least one candidate image in the image library.

In a possible implementation, the image retrieval method may be applied to pedestrian re-identification. When the image retrieval method is applied to pedestrian re-identification, the query image may be an image including a target pedestrian, and each candidate image in the image library may also be an image including a pedestrian.

In the embodiments, after the image group including the query image and the at least one candidate image is obtained, before an intermediate similarity between any two images in the image group is calculated, the method further includes extracting features of each image in the image group.

In a possible implementation, features of the query image and features of each candidate image may be extracted by using a feature extraction network. The feature extraction network may be a deep neural network. For example, the feature extraction network is ResNet50, ResNet101, or Inception.

At step S12, an intermediate similarity between any two images in the image group is calculated.

An intermediate similarity between two images may represent an initial value of a similarity between the two images.

In the embodiments, a multi-scale feature vector of each image may be first obtained through calculation, and then the intermediate similarity between the any two images is calculated based on the multi-scale feature vector. The multi-scale feature vector may indicate multiple feature vectors of different scales, or may indicate that one feature vector involves multiple different scales. A value range of the intermediate similarity may be [0,1].

Certainly, the intermediate similarity between the any two images may be calculated in other manners, which are not limited here.

In a possible implementation, a greater intermediate similarity between two images may indicate a higher possibility that the two images include same content. For example, during pedestrian re-identification, a greater intermediate similarity between two images indicates a higher possibility that the two images include a same pedestrian.

At step S13, multi-scale feature fusion is performed based on the intermediate similarity between the any two images to obtain a final similarity between the query image and each candidate image.

In the embodiments, the final similarity between the query image and the candidate image may indicate a final value of a similarity between the query image and the candidate image, that is, may indicate a finally determined similarity between the query image and the candidate image.

In the embodiments, a value range of the final similarity may be [0, 1].

In a possible implementation, a greater final similarity between two images may indicate a higher possibility that the two images include same content. For example, when the image retrieval method is applied to pedestrian re-identification, a greater final similarity between two images indicates a higher possibility that the two images include a same pedestrian.

In a possible implementation, a conditional random field algorithm is used to perform multi-scale feature fusion on the intermediate similarity between the any two images until a similarity between the query image and the candidate image after the fusion is converged, to obtain the final similarity between the query image and each candidate image.

In a possible implementation, a probabilistic graphical model may be established by using the conditional random field algorithm. The probabilistic graphical model may be an undirected graph. In this implementation, the query image and each candidate image may be used as nodes in the probabilistic graphical model, respectively. A weight of an edge between a query image node and a candidate image node may be equal to a final similarity estimate between the query image and the candidate image, and a weight of an edge between two candidate image nodes may be equal to an intermediate similarity between the two candidate images. An initial value of the weight of the edge between the query image node and the candidate image node may be equal to an initial value of the final similarity estimate between the query image and the candidate image. In this implementation, a relationship between the query image and the candidate image may be considered as a unary item in a conditional random field, and a relationship between the candidate images may be considered as a binary item in the conditional random field. In this implementation, information may be transmitted based on a weight of an edge between nodes, to constrain the final similarity estimate between the query image and the candidate image until the final similarity estimate between the query image and the candidate image is converged, to obtain the final similarity between the query image and each candidate image. The conditional random field algorithm is used to constrain the final similarity estimate between the query image and the candidate image until the final similarity estimate between the query image and the candidate image is converged, so that a reliable and stable final similarity between the query image and the candidate image can be obtained. For example, if an image A and an image B include a same pedestrian, and the image A and an image C also include a same pedestrian, a final similarity between the image B and the image C should also be relatively high. The final similarity estimate may indicate an estimate value of the final similarity.

In a possible implementation, after each round of final similarity constraint is performed, normalization processing may be performed on the final similarity estimate between the query image and the candidate image, so that the final similarity estimate between the query image and the candidate image falls within a value range [0, 1].

At step S14, a target image corresponding to the query image is determined from each candidate image based on the final similarity.

In the embodiments, the target image corresponding to the query image may be a candidate image including same or similar content as the query image. For example, in pedestrian re-identification, the target image corresponding to the query image may be an image in the candidate image including a same pedestrian as the query image.

In a possible implementation, the determining a target image corresponding to the query image from each candidate image based on the final similarity includes: using a candidate image whose final similarity is greater than a preset threshold as the target image corresponding to the query image.

In another possible implementation, the determining a target image corresponding to the query image from each candidate image based on the final similarity includes: determining N candidate images having the greatest final similarity to the query image as the target images corresponding to the query image, where N is a positive integer.

In an example of this implementation, a candidate image having the greatest final similarity to the query image may be determined as the target image corresponding to the query image. In this example, N is equal to 1.

According to the embodiments, the image group including the query image and the at least one candidate image is obtained, the intermediate similarity between the any two images in the image group is calculated, multi-scale feature fusion is performed based on the intermediate similarity between the any two images to obtain the final similarity between the query image and each candidate image, and the target image corresponding to the query image is determined from each candidate image based on the final similarity. In this way, deep learning and a random condition vector field are combined, thereby improving precision and robustness of image retrieval.

In a possible implementation, end-to-end training may be performed by integrating the determination of the intermediate similarity, the multi-scale feature fusion, and the determination of the final similarity into one deep learning model.

Figure 2:
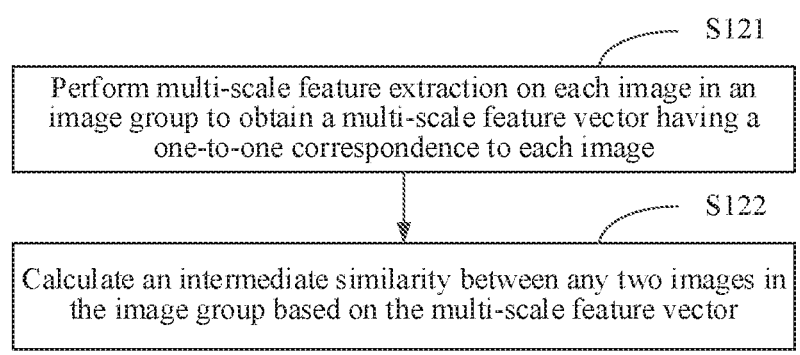
FIG. 2 is an exemplary flowchart of step S12 in an image retrieval method according to an embodiment of the present disclosure.

FIG. 2 is an exemplary flowchart of step S12 in an image retrieval method according to an embodiment of the present disclosure. As shown in FIG. 2, step S12 may include step S121 and step S122.

At step S121, multi-scale feature extraction is performed on each image in the image group to obtain a multi-scale feature vector having a one-to-one correspondence to each image.

Multi-scale feature extraction may represent extraction of features of multiple scales.

At step S122, the intermediate similarity between the any two images in the image group is calculated based on the multi-scale feature vector.

In the embodiments, multi-scale feature extraction is performed on each image in the image group, so that features of images of different scales can be fully exploited, thereby facilitating further improving accuracy of an image retrieval result and enabling the retrieved target image to be close to the query image on all scales.

Figure 3:
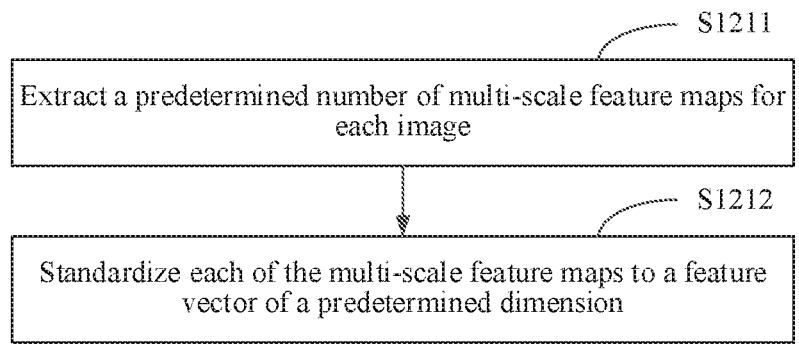
FIG. 3 is an exemplary flowchart of step S121 in an image retrieval method according to an embodiment of the present disclosure.

FIG. 3 is an exemplary flowchart of step S121 in an image retrieval method according to an embodiment of the present disclosure. As shown in FIG. 3, step S121 may include step S1211 and step S1212.

At step S1211, a predetermined number of multi-scale feature maps are extracted for each image.

The multi-scale feature map may represent feature maps of multiple scales.

In a possible implementation, feature extraction may be performed on each image in the image group by using the feature extraction network, to obtain a predetermined number of feature maps of different scales. In the embodiments, the predetermined number may be 3. The feature network uses a conventional feature extraction infrastructure network structure, such as ResNet50, ResNet101 or Inception.

At step S1212, each of the multi-scale feature maps is standardized to a feature vector of a predetermined dimension.

In a possible implementation, extracted feature maps of different scales corresponding to each image may be processed by using a pooling layer and a fully connected layer of the feature extraction network, so that the feature maps of different scales corresponding to each image are standardized to feature vectors of a same predetermined dimension. In the embodiments, the predetermined dimension may be 128 dimensions.

In the embodiments, the predetermined number of multi-scale feature maps are extracted for each image, and each of the scale feature maps is standardized to the feature vector of the predetermined dimension, thereby facilitating subsequent calculation of an intermediate similarity between images.

Figure 4:
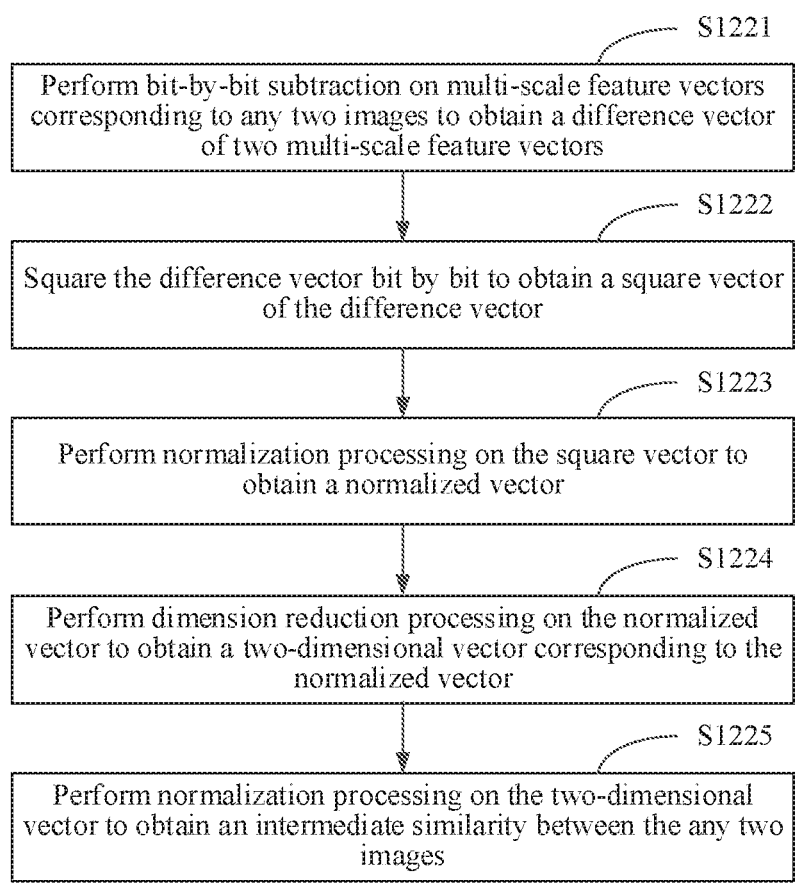
FIG. 4 is an exemplary flowchart of step S122 in an image retrieval method according to an embodiment of the present disclosure.

FIG. 4 is an exemplary flowchart of step S122 in an image retrieval method according to an embodiment of the present disclosure. As shown in FIG. 4, step S122 may include step S1221 to step S1225.

At step S1221, bit-by-bit subtraction is performed on multi-scale feature vectors corresponding to the any two images to obtain a difference vector of two multi-scale feature vectors.

In the embodiments, bit-by-bit subtraction is performed on feature vectors of a same scale to obtain a difference vector of two vectors.

At step S1222, the difference vector is squared bit by bit to obtain a square vector of the difference vector.

In the embodiments, a square value of each element in the difference vector is calculated bit by bit to obtain the square vector of the difference vector.

At step S223, normalization processing is performed on the square vector to obtain a normalized vector.

In a possible implementation, bit-by-bit standard deviation calculation is performed on the square vector obtained at step S1222 to obtain the normalized vector.

At step S1224, dimension reduction processing is performed on the normalized vector to obtain a two-dimensional vector corresponding to the normalized vector.

In a possible implementation, dimension reduction processing may be performed on the normalized vector by using a fully connected layer of a convolutional neural network to obtain the two-dimensional vector corresponding to the normalized vector. The specific process is: calculating a product of the normalized vector and a predetermined coefficient matrix, and using the product as the two-dimensional vector corresponding to the normalized vector.

In the embodiments, dimension reduction is performed on the normalized vector to obtain the two-dimensional vector. This is conducive to binary classification to determine whether two images include same content (for example, in pedestrian re-identification, determine whether two images include a same pedestrian).

At step S1225, normalization processing is performed on the two-dimensional vector to obtain the intermediate similarity between the any two images.

In the embodiments, normalization processing may be performed on the two-dimensional vector by using a Sigmoid function to determine the intermediate similarity between the any two images.

Figure 5:
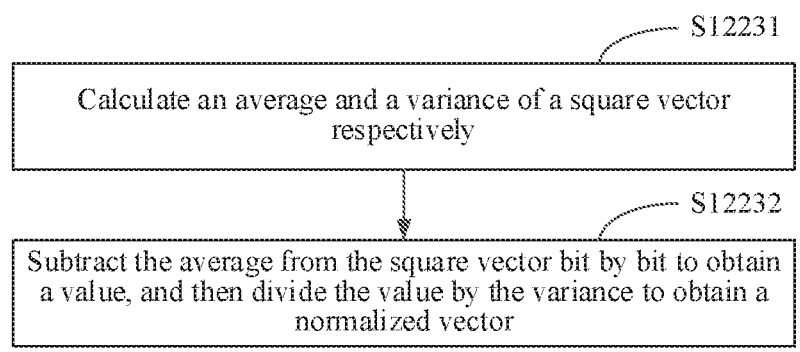
FIG. 5 is an exemplary flowchart of step S223 in an image retrieval method according to an embodiment of the present disclosure.

FIG. 5 is an exemplary flowchart of step S1223 in an image retrieval method according to an embodiment of the present disclosure. As shown in FIG. 5, step S1223 may include step S12231 and step S12232.

At step S12231, an average and a variance of the square vectors are respectively calculated.

At step S12232, the average is subtracted from the square vector bit by bit to obtain a value, and then the value is divided by the variance to obtain the normalized vector.

It should be noted that although the method for performing normalization processing on the square vector is described in FIG. 5 as above, a person skilled in the art can understand that the present disclosure is not limited thereto. A person skilled in the art may flexibly set the specific method for performing normalization processing on the square vector based on actual application scenario requirements and/or personal preferences, as long as the square vector can be normalized.

Figure 6:
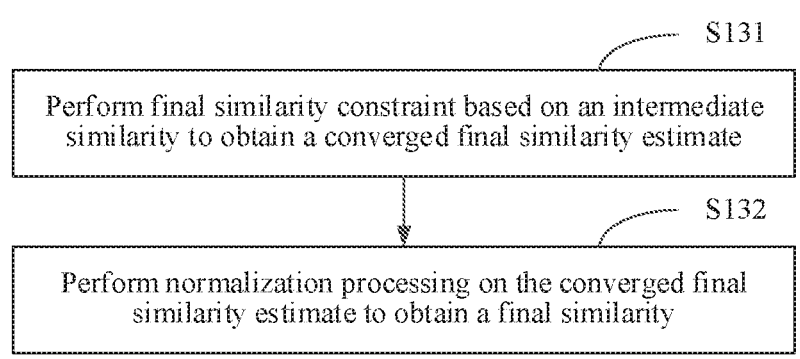
FIG. 6 is an exemplary flowchart of step S13 in an image retrieval method according to an embodiment of the present disclosure.

FIG. 6 is an exemplary flowchart of step S13 in an image retrieval method according to an embodiment of the present disclosure. As shown in FIG. 6, step S13 may include step S131 and step S132.

At step S131, final similarity constraint is performed based on the intermediate similarity to obtain a converged final similarity estimate.

In the embodiments, the final similarity constraint may represent a process of converging a final similarity estimate. In a possible implementation, a conditional random field algorithm may be used to perform final similarity constraint based on the intermediate similarity.

At step S132, normalization processing is performed on the converged final similarity estimate to obtain the final similarity.

In a possible implementation, before the performing final similarity constraint based on the intermediate similarity, the method further includes: initializing the final similarity estimate based on the intermediate similarity.

In an example of this implementation, the initializing the final similarity estimate based on the intermediate similarity may include: determining a product of the intermediate similarity between the query image and the candidate image and a specified coefficient as the initial value of the final similarity estimate between the query image and the candidate image.

Figure 7:
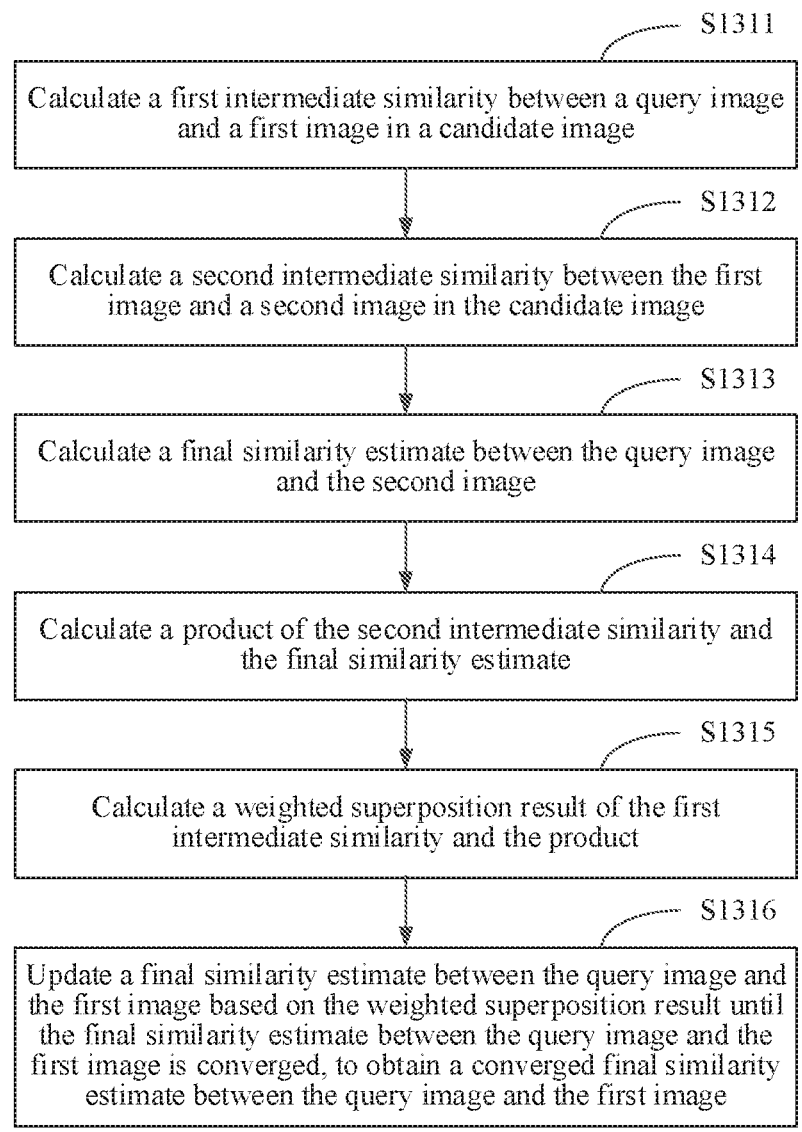
FIG. 7 is an exemplary flowchart of step S131 in an image retrieval method according to an embodiment of the present disclosure.

FIG. 7 is an exemplary flowchart of step S131 in an image retrieval method according to an embodiment of the present disclosure. As shown in FIG. 7, step S131 may include step S1311 to step S1316.

At step S1311, a first intermediate similarity between the query image and a first image in the candidate image is calculated.

The first image in the embodiments refers to a certain image in the candidate image. The term "first" here is merely for convenience of expression and reference, and does not mean that the first image corresponding to said term necessarily exists in the specific implementation of the present disclosure.

The method for calculating the first intermediate similarity between the query image and the first image in the candidate image is the same as the method for calculating the intermediate similarity above, and details are not described here again.

At step S1312, a second intermediate similarity between the first image and a second image in the candidate image is calculated.

The second image in the embodiments refers to a certain image different from the first image in the candidate image. The term "second" here is merely for convenience of expression and reference, and does not mean that the second image corresponding to said term necessarily exists in the specific implementation of the present disclosure.

The method for calculating the second intermediate similarity between the first image and the second image in the candidate image is the same as the method for calculating the intermediate similarity above, and details are not described here again.

At step S1313, a final similarity estimate between the query image and the second image is calculated.

In the embodiments, when the first round of final similarity constraint is performed, the final similarity estimate between the query image and the second image may be equal to an initial value of the final similarity estimate between the query image and the second image. The initial value of the final similarity estimate between the query image and the second image may be equal to a product of an intermediate similarity between the query image and the second image and a specified coefficient. When the (l+1)th round of final similarity constraint is performed, the final similarity estimate between the query image and the second image may be equal to a final similarity estimate between the query image and the second image obtained after the lth round of final similarity constraint is performed, where l≥1.

At step S1314, a product of the second intermediate similarity and the final similarity estimate is calculated.

At step S1315, a weighted superposition result of the first intermediate similarity and the product is calculated.

At step S1316, the final similarity estimate between the query image and the first image is updated based on the weighted superposition result until the final similarity estimate between the query image and the first image is converged, to obtain a converged final similarity estimate between the query image and the first image.

In a possible implementation, a final similarity estimate $\hat{y}_{p,i}^{l+1}$ between a query image P and a first image i after the (l+1)th round of final similarity constraint may be determined by using Equation 1:

$$\hat{y}_{p,i}^{j+1} = \frac{\sum_{s=1}^{S} \alpha^s t_{p,i}^s + \sum_{s=1}^{S} \beta^s \sum_{j \neq i} t_{i,j}^s \hat{y}_{p,j}^l}{\sum_{s=1}^{S} \alpha^s + \sum_{s=1}^{S} \beta^s \sum_{j \neq i} t_{i,j}^s}$$ Equation 1 where $\alpha^s$ represents a first parameter corresponding to a scale s, $\beta^s$ represents a second parameter corresponding to the scale s, S represents a total number of scales, $t_{p,i}^s$ represents an intermediate similarity between the query image P and the first image i on the scale s, $t_{i,j}^s$ represents an intermediate similarity between the first image i and a second image j on the scale s, and $\hat{y}_{p,j}^l$ represents a final similarity estimate between the query image P and the second image j on the scale s after the lth round of final similarity constraint.

In the embodiments, if a final similarity estimate between the query image and any candidate image is not converged, final similarity constraint may continue to be performed until the final similarity estimate between the query image and each candidate image is converged.

Figure 8:
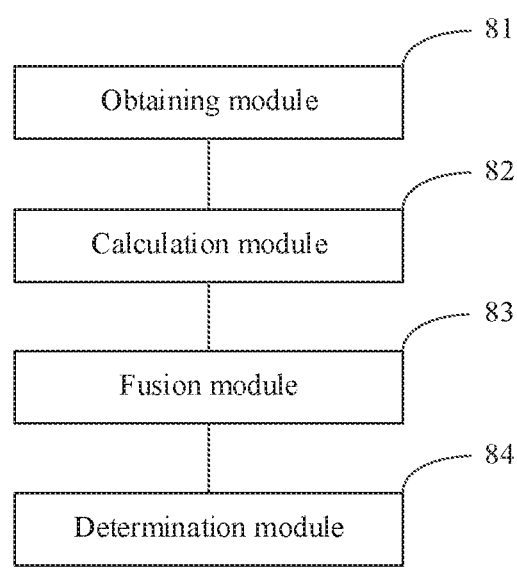
FIG. 8 is a block diagram of an image retrieval apparatus according to an embodiment of the present disclosure.

FIG. 8 is a block diagram of an image retrieval apparatus according to an embodiment of the present disclosure. As shown in FIG. 8, the apparatus includes: an obtaining module 81, configured to obtain an image group including a query image and at least one candidate image; a calculation module 82, configured to calculate an intermediate similarity between any two images in the image group; a fusion module 83, configured to perform multi-scale feature fusion based on the intermediate similarity between the any two images to obtain a final similarity between the query image and each candidate image; and a determination module 84, configured to determine a target image corresponding to the query image from each candidate image based on the final similarity.

Figure 9:
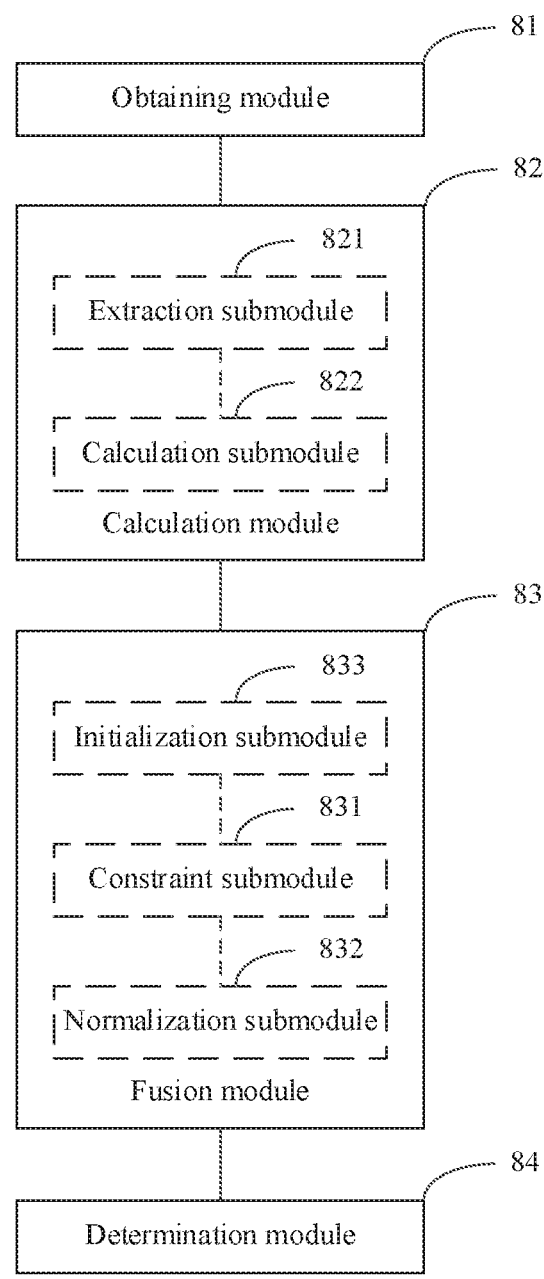
FIG. 9 is an exemplary block diagram of an image retrieval apparatus according to an embodiment of the present disclosure.

As shown in FIG. 9, FIG. 9 is an exemplary block diagram of an image retrieval apparatus according to an embodiment of the present disclosure.

In a possible implementation, the calculation module 82 includes: an extraction submodule 821, configured to perform multi-scale feature extraction on each image in the image group to obtain a multi-scale feature vector having a one-to-one correspondence to each image; and a calculation submodule 822, configured to calculate the intermediate similarity between the any two images in the image group based on the multi-scale feature vector.

In a possible implementation, the extraction submodule 821 includes: an extraction unit, configured to extract a predetermined number of multi-scale feature maps for each image; and a standardization unit, configured to standardize each of the multi-scale feature maps to a feature vector of a predetermined dimension.

In a possible implementation, the calculation submodule 822 includes: a subtraction unit, configured to perform a bit-by-bit subtraction on multi-scale feature vectors corresponding to the any two images to obtain a difference vector of two multi-scale feature vectors; a squaring unit, configured to square the difference vector bit by bit to obtain a square vector of the difference vector; a first normalization unit, configured to perform normalization processing on the square vector to obtain a normalized vector; a dimension reduction unit, configured to perform dimension reduction processing on the normalized vector to obtain a two-dimensional vector corresponding to the normalized vector; and a second normalization unit, configured to perform normalization processing on the two-dimensional vector to obtain the intermediate similarity between the any two images.

In a possible implementation, the first normalization unit includes: a calculation subunit, configured to calculate an average and a variance of the square vector respectively; and a normalization subunit, configured to subtract the average from the square vector bit by bit to obtain a value, and then divide the obtained value by the variance to obtain the normalized vector.

In a possible implementation, the dimension reduction unit is configured to: calculate a product of the normalized vector and a predetermined coefficient matrix, and use the product as the two-dimensional vector corresponding to the normalized vector.

In a possible implementation, the fusion module 83 includes: a constraint submodule 831, configured to perform final similarity constraint based on the intermediate similarity to obtain a converged final similarity estimate; and a normalization submodule 832, configured to perform normalization processing on the converged final similarity estimate to obtain the final similarity.

In a possible implementation, the fusion module 83 further includes an initialization submodule 833, configured to initialize the final similarity estimate based on the intermediate similarity.

In a possible implementation, the constraint submodule 831 includes: a first calculation unit, configured to calculate a first intermediate similarity between the query image and a first image in the candidate image; a second calculation unit, configured to calculate a second intermediate similarity between the first image and a second image in the candidate image; a third calculation unit, configured to calculate a final similarity estimate between the query image and the second image; a fourth calculation unit, configured to calculate a product of the second intermediate similarity and the final similarity estimate; a fifth calculation unit, configured to calculate a weighted superposition result of the first intermediate similarity and the product; and a determination unit, configured to update the final similarity estimate between the query image and the first image based on the weighted superposition result until the final similarity estimate between the query image and the first image is converged, to obtain a converged final similarity estimate between the query image and the first image.

In a possible implementation, the determination module 84 is configured to use a candidate image whose final similarity is greater than a preset threshold as the target image corresponding to the query image.

According to the embodiments, the image group including the query image and the at least one candidate image is obtained, the intermediate similarity between the any two images in the image group is calculated, multi-scale feature fusion is performed based on the intermediate similarity between the any two images to obtain the final similarity between the query image and each candidate image, and the target image corresponding to the query image is determined from each candidate image based on the final similarity, so that precision and robustness of image retrieval can be improved.

Figure 10:
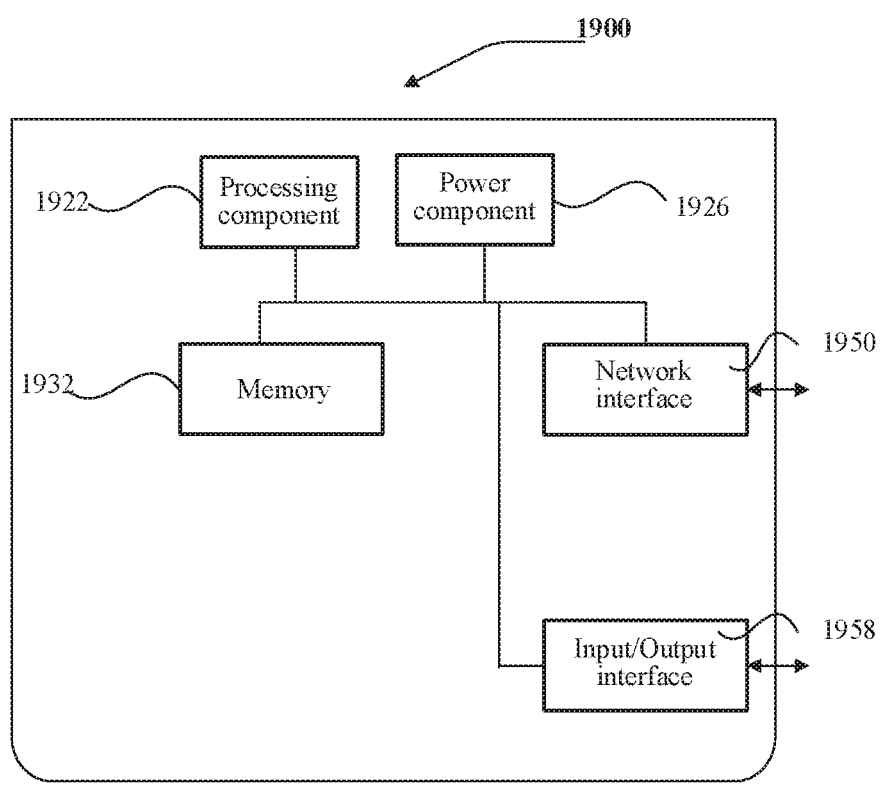
FIG. 10 is a block diagram of an image retrieval apparatus 1900 according to an exemplary embodiment.

FIG. 10 is a block diagram of an image retrieval apparatus 1900 according to an exemplary embodiment. For example, the apparatus 1900 may be provided as a server. Referring to FIG. 10, the apparatus 1900 includes a processing component 1922 that further includes one or more processors; and a memory resource represented by a memory 1932, configured to store instructions, for example, an application program, that may be executed by the processing component 1922. The application program stored in the memory 1932 may include one or more modules each corresponding to a set of instructions. In addition, the processing component 1922 is configured to execute the instructions to perform the foregoing method.

The apparatus 1900 may further include: a power component 1926, configured to perform power management of the apparatus 1900; a wired or wireless network interface 1950, configured to connect the apparatus 1900 to a network; and an Input/Output (I/O) interface 1958. The apparatus 1900 may operate an operating system stored in the memory 1932, such as Windows Server™, Mac OS X™, Unix™ Linux™, or FreeBSD™.

In this exemplary embodiment, a non-volatile computer readable storage medium, for example, the memory 1932 including computer program instructions, is further provided. The computer program instructions may be executed by the processing component 1922 in the apparatus 1900 to complete the foregoing method.

The present disclosure may be a system, a method, and/or a computer program product. The computer program product may include a computer readable storage medium, and computer readable program instructions that are used by the processor to implement various aspects of the present disclosure are loaded on the computer readable storage medium.

The computer readable storage medium may be a tangible device that can maintain and store instructions used by an instruction execution device. For example, the computer readable storage medium is but is not limited to an electrical storage device, a magnetic storage device, an optical storage device, an electromagnetic storage device, a semiconductor storage device, or any appropriate combination thereof. More specific examples (a non-exhaustive list) of the computer readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing instructions or a protrusion structure in a groove, and any appropriate combination thereof. The computer readable storage medium used here is not interpreted as an instantaneous signal such as a radio wave or another freely propagated electromagnetic wave, an electromagnetic wave propagated by a waveguide or another transmission medium (for example, an optical pulse transmitted by an optical fiber cable), or an electrical signal transmitted by a wire.

The computer readable program instructions described here may be downloaded from a computer readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter or a network interface in each computing/processing device receives the computer readable program instructions from the network, and forwards the computer readable program instructions, so that the computer readable program instructions are stored in a computer readable storage medium in each computing/processing device.

Computer program instructions for executing the operations of the present disclosure may be compilation instructions, Instruction Set Architecture (ISA) instructions, machine instructions, machine-related instructions, microcode, firmware instructions, status setting data, or source code or target code written in any combination of one or more programming languages. The programming languages include an object-oriented programming language such as Smalltalk or C++, and a conventional procedural programming language such as the "C" language or a similar programming language. The program readable program instructions may be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any kind of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer readable program instructions, and the electronic circuit may execute the computer readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams may be implemented by using the computer readable program instructions.

These computer readable program instructions may be provided for a general-purpose computer, a dedicated computer, or a processor of another programmable data processing apparatus to generate a machine, so that when the instructions are executed by the computer or the processor of the another programmable data processing apparatus, an apparatus for implementing a specified function/action in one or more blocks in the flowcharts and/or block diagrams is generated. These computer readable program instructions may also be stored in a computer readable storage medium, and these instructions may instruct a computer, a programmable data processing apparatus, and/or another device to work in a specific manner. Therefore, the computer readable storage medium storing the instructions includes an artifact, and the artifact includes instructions for implementing a specified function/action in one or more blocks in the flowcharts and/or block diagrams.

The computer readable program instructions may be loaded onto a computer, another programmable data processing apparatus, or another device, so that a series of operations and steps are executed on the computer, the another programmable apparatus, or the another device, thereby generating computer-implemented processes. Therefore, the instructions executed on the computer, the another programmable apparatus, or the another device implement a specified function/action in one or more blocks in the flowcharts and/or block diagrams.

The flowcharts and block diagrams in the accompanying drawings show possible architectures, functions, and operations of the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system that executes a specified function or action, or may be implemented by using a combination of dedicated hardware and a computer instruction.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terms used in the specification are intended to best explain the principles of the embodiments, practical applications, or technical improvements to the technologies in the market, or to enable others of ordinary skill in the art to understand the embodiments disclosed in the specification.

The invention claimed is:

1. An image retrieval method, comprising:
   obtaining an image group comprising a query image and at least one candidate image;
   calculating an intermediate similarity between any two images in the image group;
   performing multi-scale feature fusion based on the intermediate similarity between the any two images to obtain a final similarity between the query image and each candidate image;
   determining a target image corresponding to the query image from each candidate image based on the final similarity;
   wherein the calculating an intermediate similarity between any two images in the image group further comprises:
   performing multi-scale feature extraction on each image in the image group to obtain a multi-scale feature vector having a one-to-one correspondence to each image; and
   calculating the intermediate similarity between the any two images in the image group based on the multi-scale feature vector, wherein the calculating the intermediate similarity between the any two images in the image group based on the multi-scale feature vector further comprises:
   performing bit-by-bit subtraction on multi-scale feature vectors corresponding to the any two images to obtain a difference vector of two multi-scale feature vectors,
   squaring the difference vector bit by bit to obtain a square vector of the difference vector,
   performing normalization processing on the square vector to obtain a normalized vector,
   performing dimension reduction processing on the normalized vector to obtain a two-dimensional vector corresponding to the normalized vector, and
   performing normalization processing on the two-dimensional vector to obtain the intermediate similarity between the any two images.

2. The method according to claim 1, wherein performing multi-scale feature extraction on each image in the image group to obtain the multi-scale feature vector having the one-to-one correspondence to each image comprises:
   extracting a predetermined number of multi-scale feature maps for each image; and
   standardizing each of the multi-scale feature maps to a feature vector of a predetermined dimension.

3. The method according to claim 1, wherein performing normalization processing on the square vector to obtain the normalized vector comprises:
   calculating an average and a variance of the square vector respectively; and
   subtracting the average from the square vector bit by bit to obtain a value, and then dividing the value by the variance to obtain the normalized vector.

4. The method according to claim 1, wherein performing dimension reduction processing on the normalized vector to obtain the two-dimensional vector corresponding to the normalized vector comprises:
   calculating a product of the normalized vector and a predetermined coefficient matrix, and using the product as the two-dimensional vector corresponding to the normalized vector.

5. The method according to claim 1, wherein performing multi-scale feature fusion based on the intermediate similarity to obtain the final similarity between the query image and each candidate image comprises:
   performing final similarity constraint based on the intermediate similarity to obtain a converged final similarity estimate; and
   performing normalization processing on the converged final similarity estimate to obtain the final similarity.

6. The method according to claim 5, wherein before performing final similarity constraint based on the intermediate similarity, the method further comprises:
   initializing the final similarity estimate based on the intermediate similarity.

7. The method according to claim 5, wherein performing final similarity constraint based on the intermediate similarity to obtain the converged final similarity estimate comprises:
   calculating a first intermediate similarity between the query image and a first image in the candidate image;
   calculating a second intermediate similarity between the first image and a second image in the candidate image;
   calculating a final similarity estimate between the query image and the second image;
   calculating a product of the second intermediate similarity and the final similarity estimate;
   calculating a weighted superposition result of the first intermediate similarity and the product; and
   updating the final similarity estimate between the query image and the first image based on the weighted superposition result until the final similarity estimate between the query image and the first image is converged, to obtain a converged final similarity estimate between the query image and the first image.

8. The method according to claim 1, wherein determining the target image corresponding to the query image from each candidate image based on the final similarity comprises:
   using a candidate image whose final similarity is greater than a preset threshold as the target image corresponding to the query image.

9. An image retrieval apparatus, comprising:
   a processor; and a memory having stored thereon instructions that, when executed by the processor, cause the processor to:

obtain an image group comprising a query image and at least one candidate image;

calculate an intermediate similarity between any two images in the image group;

perform multi-scale feature fusion based on the intermediate similarity between the any two images to obtain a final similarity between the query image and each candidate image;

determine a target image corresponding to the query image from each candidate image based on the final similarity;

wherein calculating the intermediate similarity between any two images in the image group comprises:

performing multi-scale feature extraction on each image in the image group to obtain a multi-scale feature vector having a one-to-one correspondence to each image; and calculating the intermediate similarity between the any two images in the image group based on the multi-scale feature vector, wherein the calculating the intermediate similarity between the any two images in the image group based on the multi-scale feature vector further comprises:

performing bit-by-bit subtraction on multi-scale feature vectors corresponding to the any two images to obtain a difference vector of two multi-scale feature vectors, squaring the difference vector bit by bit to obtain a square vector of the difference vector, performing normalization processing on the square vector to obtain a normalized vector, performing dimension reduction processing on the normalized vector to obtain a two-dimensional vector corresponding to the normalized vector, and performing normalization processing on the two-dimensional vector to obtain the intermediate similarity between the any two images.

10. The apparatus according to claim 9, wherein performing multi-scale feature extraction on each image in the image group to obtain the multi-scale feature vector having the one-to-one correspondence to each image comprises:

extracting a predetermined number of multi-scale feature maps for each image; and standardizing each of the multi-scale feature maps to a feature vector of a predetermined dimension.

11. The apparatus according to claim 9, wherein performing normalization processing on the square vector comprises:

calculating an average and a variance of the square vector respectively; and subtracting the average from the square vector bit by bit to obtain a value, and then dividing the value by the variance to obtain the normalized vector, or the performing dimension reduction processing on the normalized vector to obtain the two-dimensional vector corresponding to the normalized vector further comprises calculating a product of the normalized vector and a predetermined coefficient matrix and using the product as the two-dimensional vector corresponding to the normalized vector.

12. The apparatus according to claim 9, wherein performing multi-scale feature fusion based on the intermediate similarity to obtain the final similarity between the query image and each candidate image comprises:

performing final similarity constraint based on the intermediate similarity to obtain a converged final similarity estimate; and performing normalization processing on the converged final similarity estimate to obtain the final similarity.

13. The apparatus according to claim 12, wherein before performing final similarity constraint based on the intermediate similarity, the processor is further caused to:

initialize the final similarity estimate based on the intermediate similarity.

14. The apparatus according to claim 12, wherein performing final similarity constraint based on the intermediate similarity to obtain the converged final similarity estimate comprises:

calculating a first intermediate similarity between the query image and a first image in the candidate image;

calculating a second intermediate similarity between the first image and a second image in the candidate image;

calculating a final similarity estimate between the query image and the second image;

calculating a product of the second intermediate similarity and the final similarity estimate;

calculating a weighted superposition result of the first intermediate similarity and the product; and updating the final similarity estimate between the query image and the first image based on the weighted superposition result until the final similarity estimate between the query image and the first image is converged, to obtain a converged final similarity estimate between the query image and the first image.

15. The apparatus according to claim 9, wherein determining the target image corresponding to the query image from each candidate image based on the final similarity comprises:

using a candidate image whose final similarity is greater than a preset threshold as the target image corresponding to the query image.

16. A non-transitory computer readable storage medium having computer program instructions stored thereon, wherein when the computer program instructions are executed by a processor, the processor is caused to execute an image retrieval method, comprising:

obtaining an image group comprising a query image and at least one candidate image;

calculating an intermediate similarity between any two images in the image group;

performing multi-scale feature fusion based on the intermediate similarity between the any two images to obtain a final similarity between the query image and each candidate image;

determining a target image corresponding to the query image from each candidate image based on the final similarity;

wherein the calculating an intermediate similarity between any two images in the image group further comprises:

performing multi-scale feature extraction on each image in the image group to obtain a multi-scale feature vector having a one-to-one correspondence to each image; and calculating the intermediate similarity between the any two images in the image group based on the multi-scale feature vector, wherein the calculating the intermediate similarity between the any two images in the image group based on the multi-scale feature vector further comprises:

performing bit-by-bit subtraction on multi-scale feature vectors corresponding to the any two images to obtain a difference vector of two multi-scale feature vectors, squaring the difference vector bit by bit to obtain a square vector of the difference vector, performing normalization processing on the square vector to obtain a normalized vector, performing dimension reduction processing on the normalized vector to obtain a two-dimensional vector corresponding to the normalized vector, and performing normalization processing on the two-dimensional vector to obtain the intermediate similarity between the any two images.

* * * * *